United States Patent [19]

Koll

[11] 4,433,968

[45] Feb. 28, 1984

[54] ROUND TOP RIMMING MACHINE

[75] Inventor: Eugene A. Koll, Mounds View, Minn.

[73] Assignee: Champion International Corporation, Stamford, Conn.

[21] Appl. No.: 357,837

[22] Filed: Mar. 15, 1982

[51] Int. Cl.$^3$ .............................................. B29C 17/02

[52] U.S. Cl. ..................................... 425/392; 264/310

[58] Field of Search ................................ 425/391, 392

[56] References Cited

U.S. PATENT DOCUMENTS

| | | | |
|---|---|---|---|
| 3,192,565 | 7/1965 | Rukavina | 425/392 |
| 3,337,919 | 8/1967 | Brown | 425/391 |
| 3,548,457 | 12/1970 | Kulig | 425/392 |
| 3,914,102 | 10/1975 | Brown | 425/392 |
| 4,204,462 | 5/1980 | Richards | 198/621 |

*Primary Examiner*—James H. Derrington

*Attorney, Agent, or Firm*—Evelyn M. Sommer; John H. Mulholland

[57] ABSTRACT

Disclosed is an apparatus for beading the edge or rim of a cup having a seamed annular sidewall and a polygonal base. A spinning head having a plurality of radially moveable forming members for contact with the rim to produce a bead is located over and in register with a cup-supporting base plate. The base plate together with relatively moveable socket forming wall members provides a seat for the cup on a cam operated elevator device which moves the cup upwardly. The socket is complementary to the polygonal base to prevent rotation of the seated and supported cup relative to the socket. The socket walls retract into a common horizontal plane with the base plate to permit rotationally driven star wheels to guide and confine cups onto the base plate in register with the forming means and off of the base plate away from the forming means. An air stream is directed into the cup to produce a positive pressure which inhibits dust from entering the cup during the forming operation.

18 Claims, 11 Drawing Figures

ROUND TOP RIMMING MACHINE

BACKGROUND OF THE INVENTION

The invention relates to an apparatus for beading a cup edge and is particularly useful for forming the rim of a cup having a seamed annular sidewall and a polygonal base.

It has previously been known to provide a cylindrical container with a beaded rim by grasping the container sidewall and holding it against a bead forming spinning head. Typically the grasping has been by means of two parallel opposed gripping jaws. The problem with this type of cup holding device for spin forming operations has been a potential of damage to the sidewall of the container if it is grasped too tightly between the opposing jaws or slippage when it is grasped too loosely. An example of such a typical grasping device in combination with a conventional head is shown in U.S. Pat. No. 4,204,462 to Richards, et al.

The use of star wheels for guiding, advancing and containing bottles and other containers has heretofore been common, particularly in those machines utilized for filling and capping bottles with fluid materials. The combination of star wheels to guide and confine a polygonal based cup to be beaded by a spinning operation with a complementary polygonal socket to prevent cup rotation is believed novel, however.

SUMMARY OF THE INVENTION

The invention relates to an apparatus for beading the rim of a cup having a seamed annular sidewall and a polygonal base. The apparatus includes, in combination, a means for supporting the cup in register with the bead forming means and cam operated elevator means to move the cup and the supporting means toward the forming means to move the rim into and out of contact therewith. Because the forming means spins, its contact with the cup edge, unless the cup is restrained, will create a spinning motion in the cup in a manner which will lessen or essentially eliminate relative motion between the cup and the forming means. This inhibits proper beading of the cup edge.

The means for supporting the cup in register with the bead forming means includes a socket complementary to the polygonal base of the cup to prevent rotation of the cup relative to the socket when the cup is seated therein. The cup is, therefore, restrained without the necessity of it being tightly grasped from opposite sides and damaged. The socket walls retract into a common horizontal plane with a base plate on the elevator means to permit rotationally driven star wheels to guide and confine cups onto the base plate and off of the base plate away from the forming means. Further details of the apparatus will be apparent from the drawings and the detailed description of the preferred embodiment to follow.

DETAILED DESCRIPTION OF THE ILLUSTRATED EMBODIMENT

Figure 1:
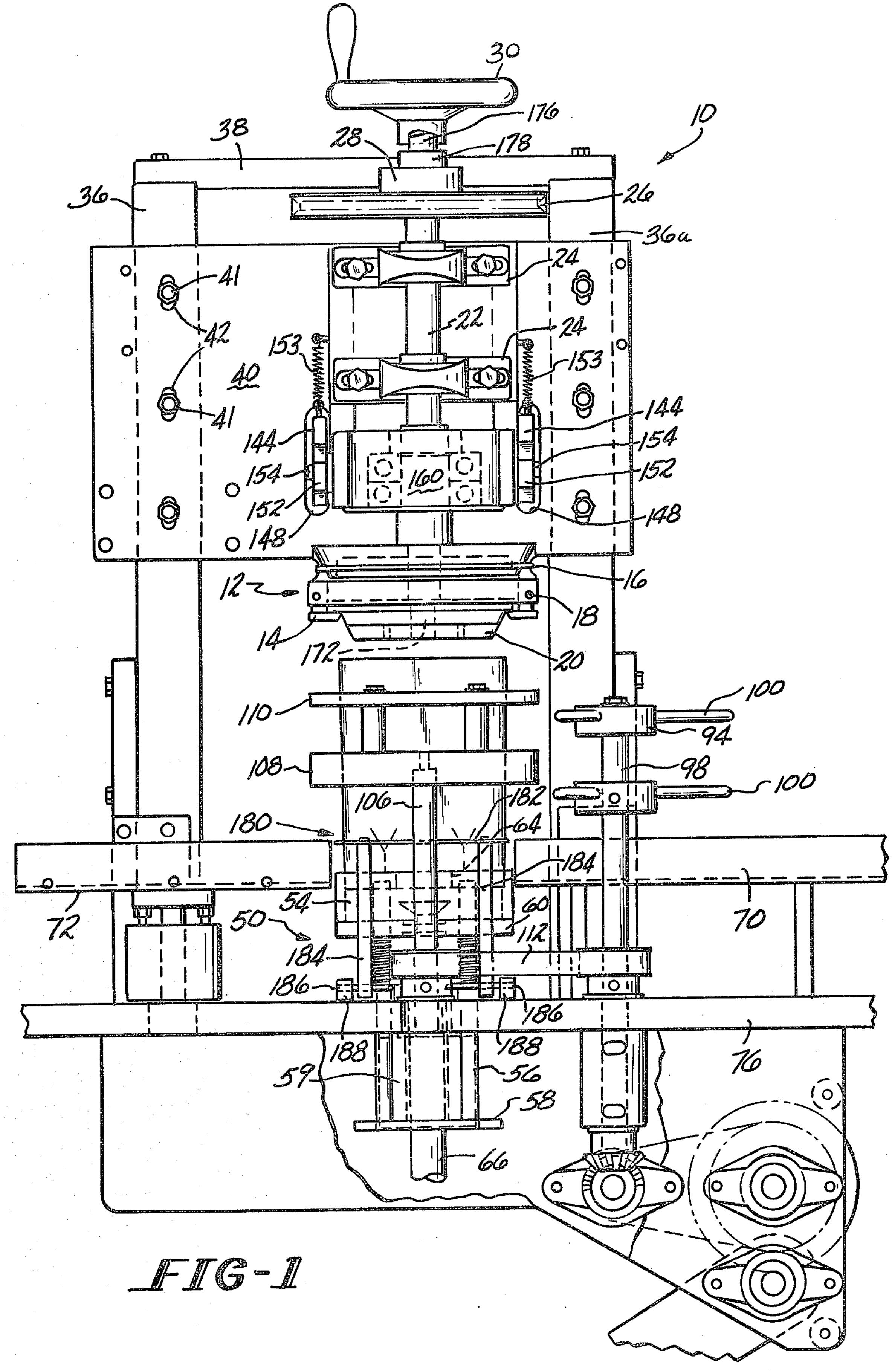
FIG. 1 is a partial front elevational view of an apparatus for beading a cup edge made in accordance with the principles of the invention with portions broken away for clarity.
Figure 2:
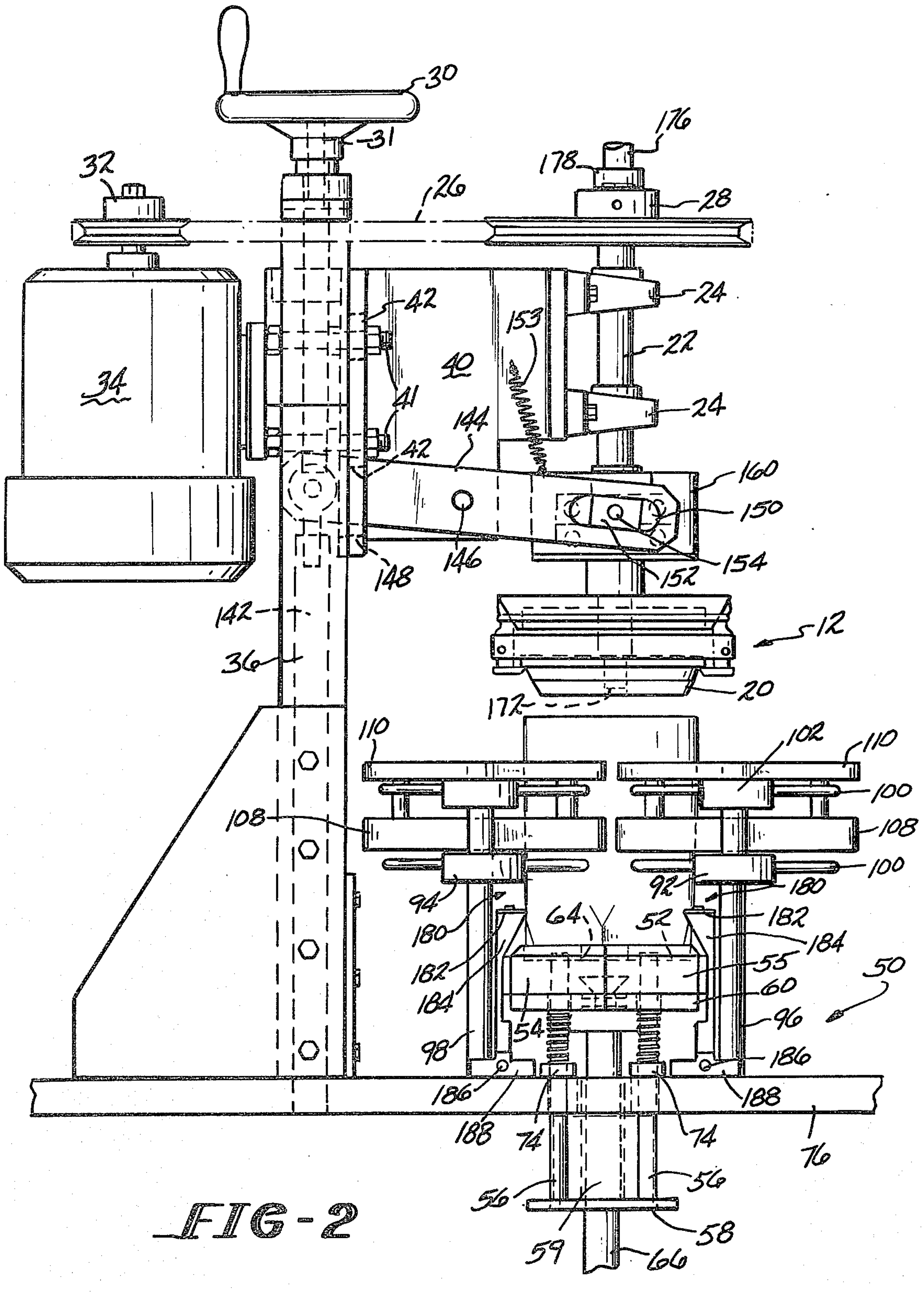
FIG. 2 is a partial side elevation of the apparatus of FIG. 1.
Figure 3:
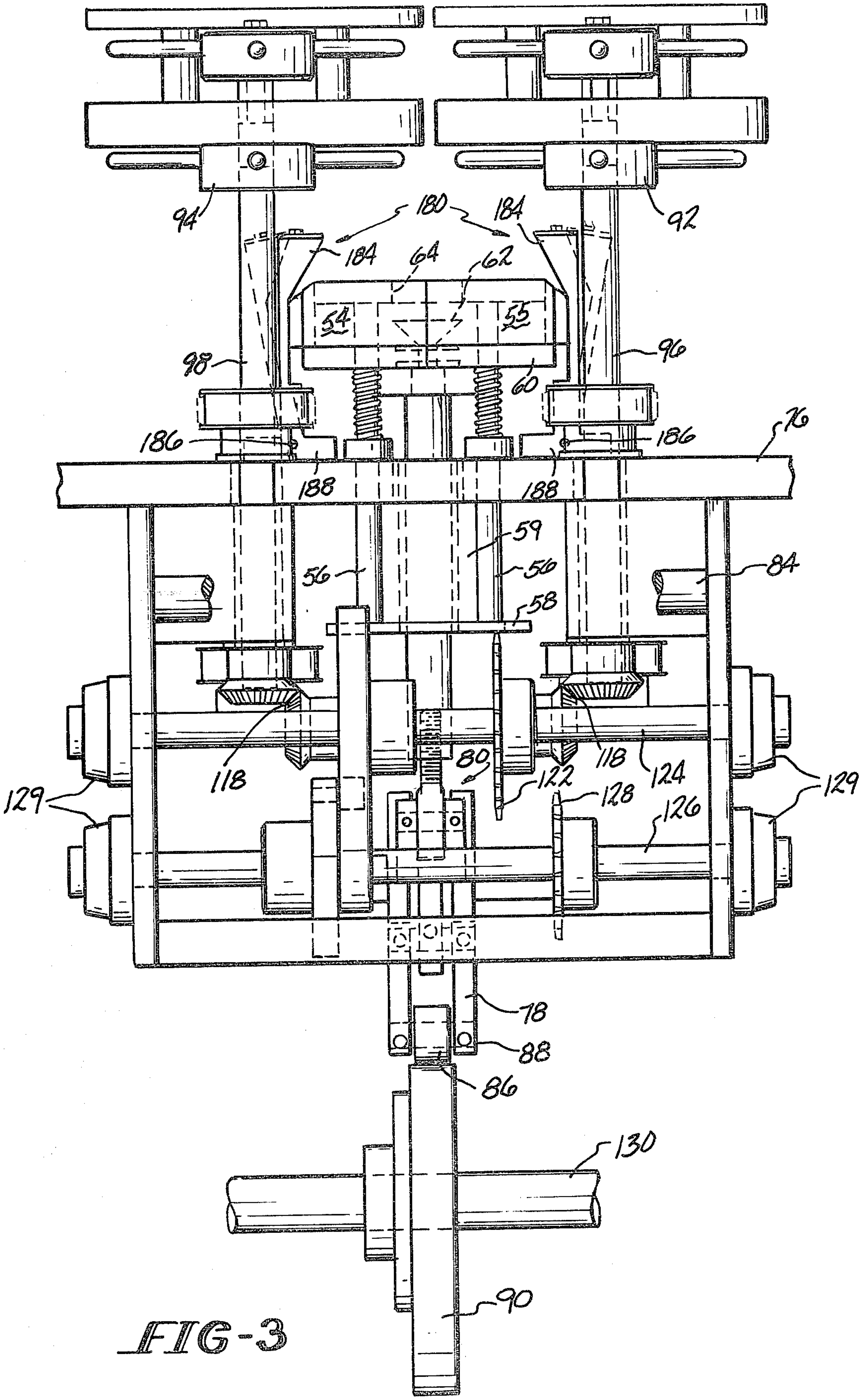
FIG. 3 is a partial side elevational view of the apparatus of FIGS. 1 and 2 showing the elevator and star wheel drive means.
Figure 4:
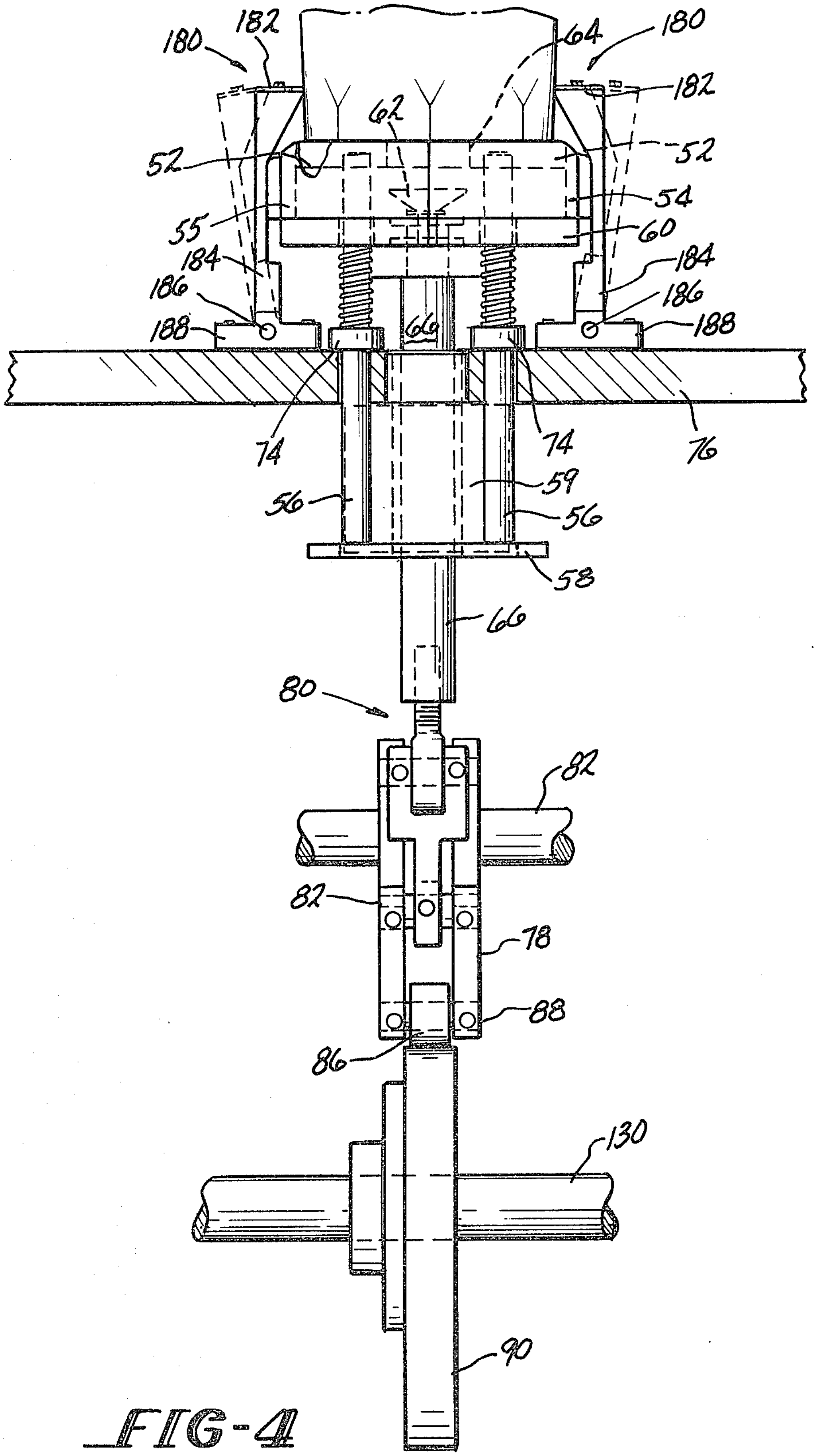
FIG. 4 is a partial side elevational view of the apparatus of FIGS. 1 to 3 showing the details of the elevator drive means.
Figure 5:
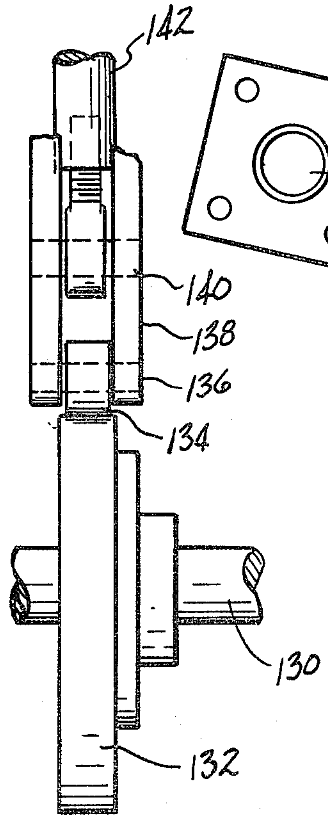
FIG. 5 is a fragmentary side elevational view of the cam and follower which cause the spinning head forming members to move radially.
Figure 6:
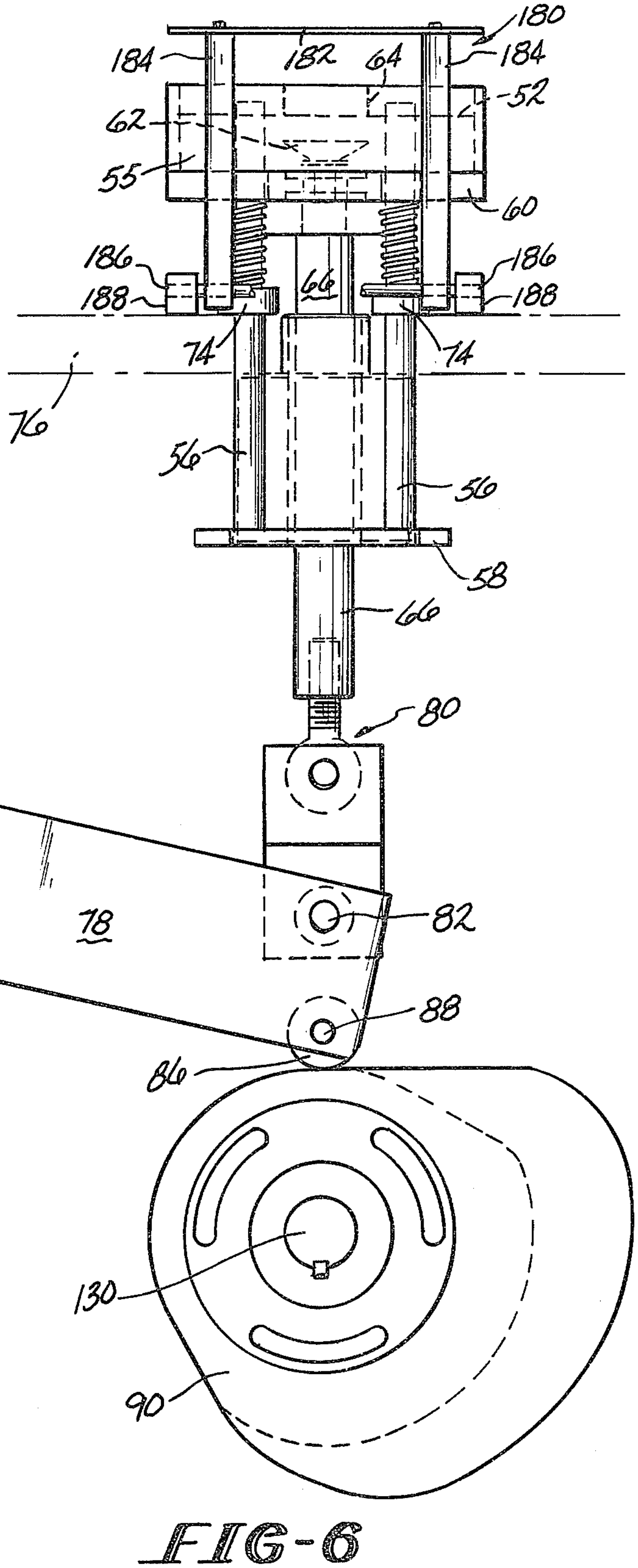
FIG. 6 is a partial front elevational view of the apparatus of FIGS. 1 to 5 showing the details of the elevator drive means.
Figure 7:
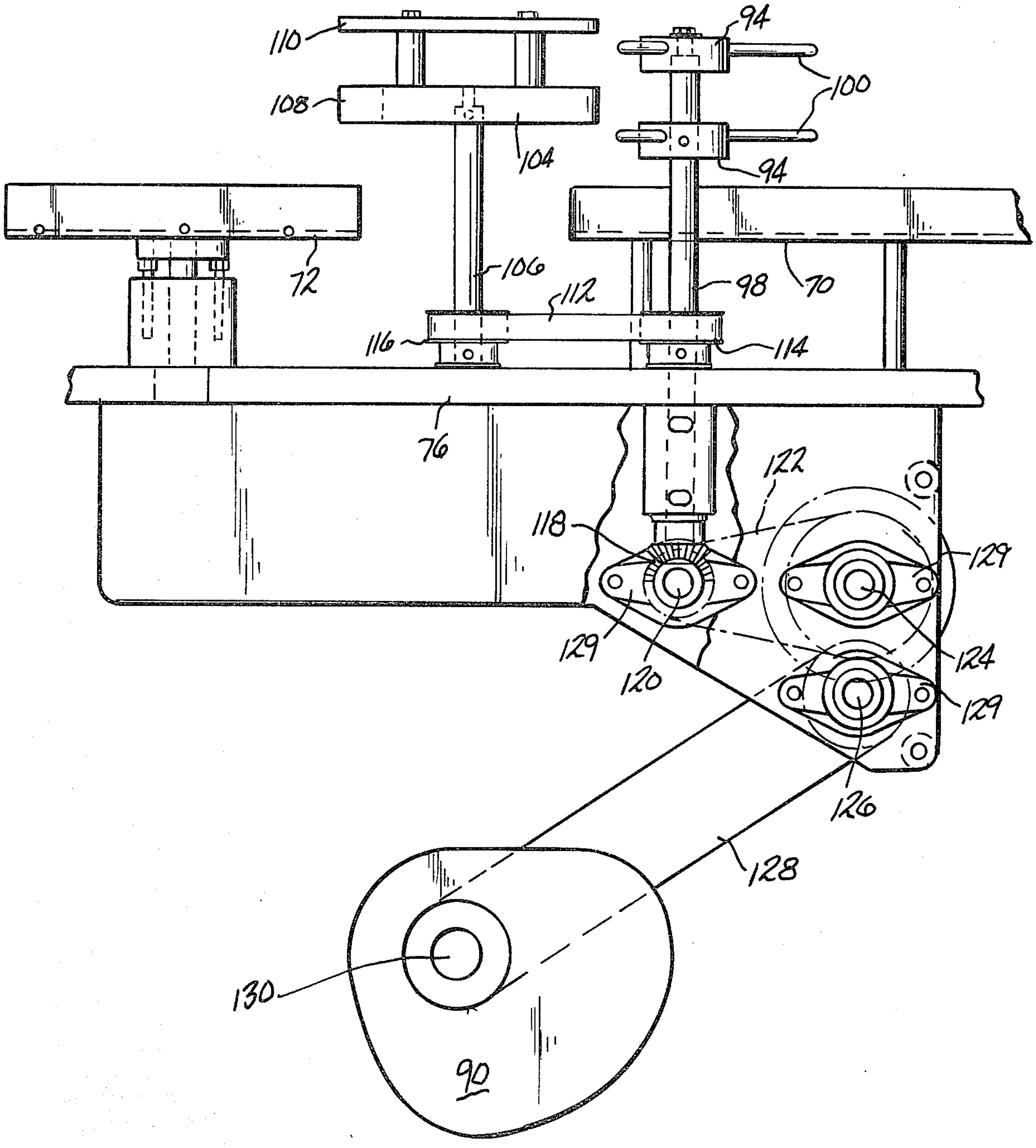
FIG. 7 is a partial front elevational view of the apparatus of FIGS. 1 to 6 showing the details of the star wheel drive means.
Figure 8:
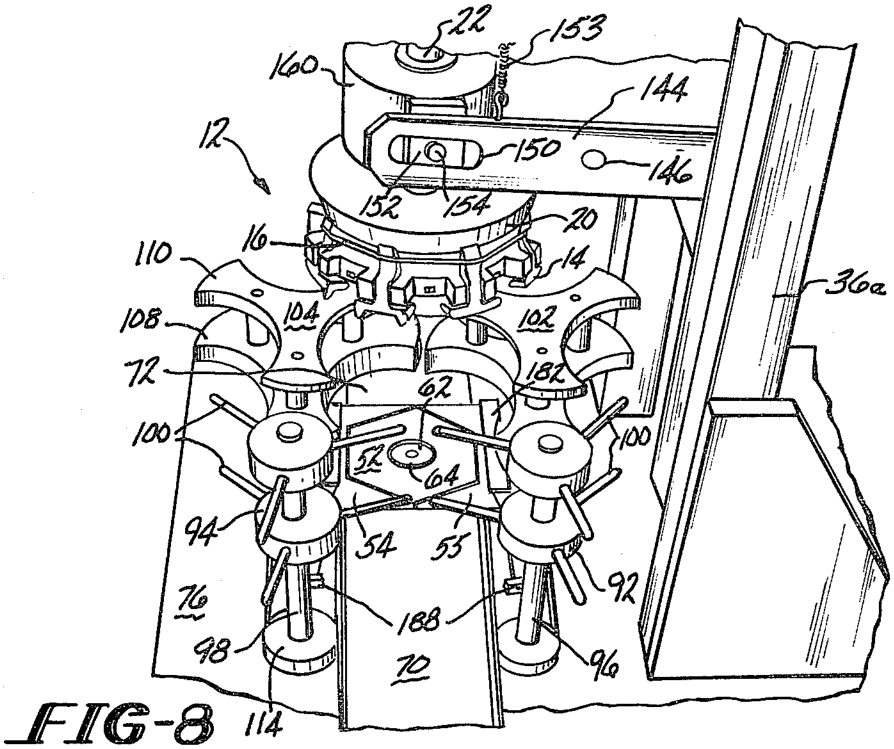
FIG. 8 is a partial side perspective view of the apparatus of FIGS. 1 to 7 with the elevator means in the cup receiving or exiting condition.
Figure 9:
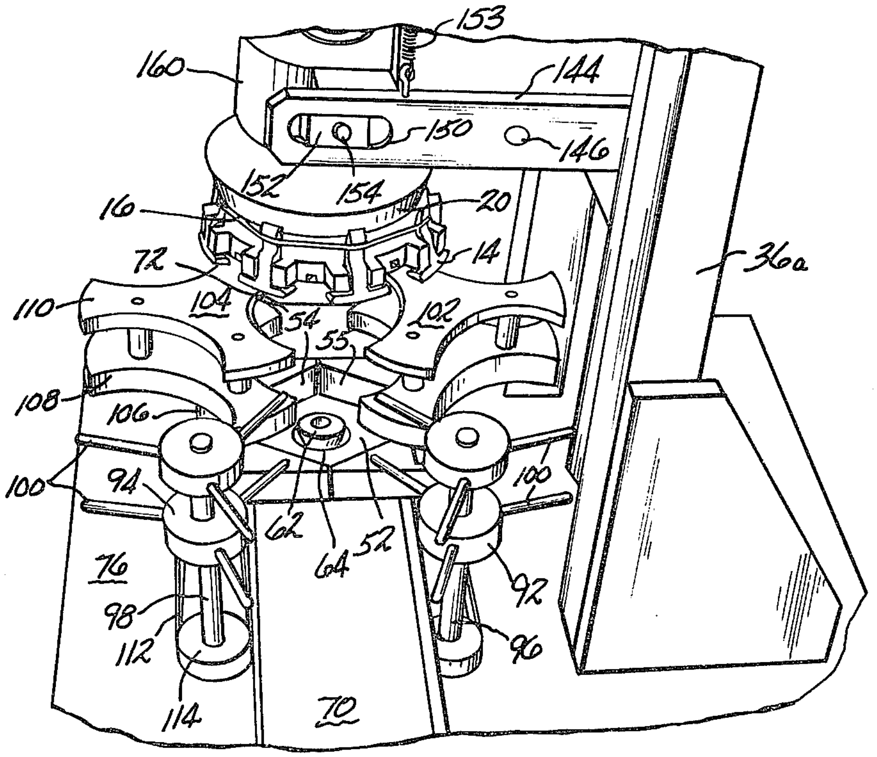
FIG. 9 is a partial side perspective view of the apparatus of FIGS. 1 to 8 with the elevator means in the cup retaining position.
Figure 10:
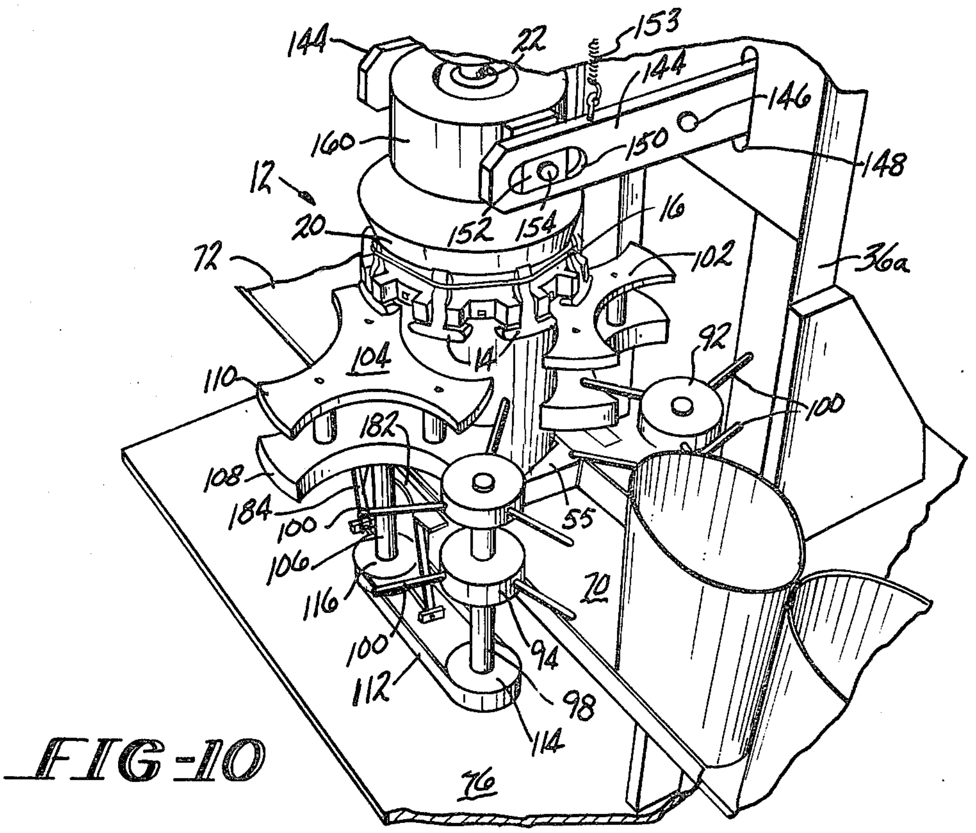
FIG. 10 is a partial perspective view of the apparatus of FIGS. 1 to 9 with a cup retained on the elevator means.
Figure 11:
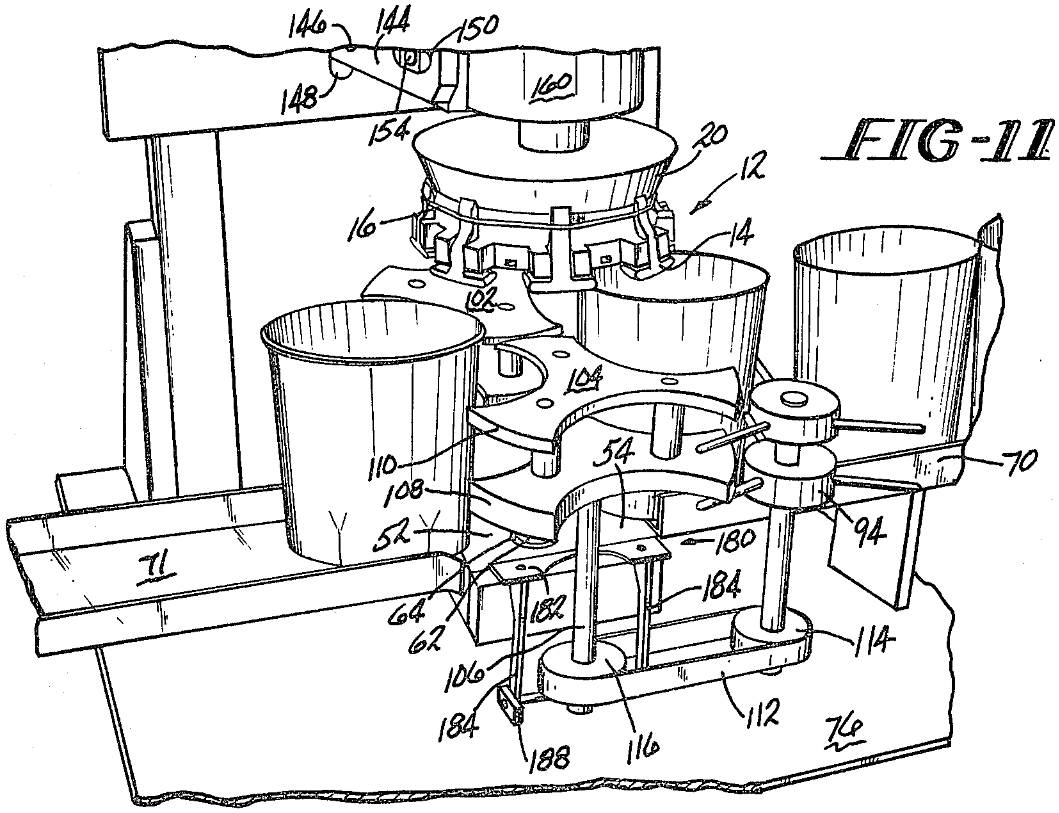
FIG. 11 is a partial perspective view of the apparatus of FIGS. 1 to 10 with a cup being moved on the elevator means by the star wheels.

The apparatus for beading the edge of a cup having a seamed annular sidewall and polygonal base is generally designated in the drawings by the numeral 10.

The apparatus 10 includes a conventional spinning head generally designated by the numeral 12. The head 12 has a plurality of radially moveable forming members 14 for contact with the rim of a cup having a seamed annular sidewall and a polygonal base. The forming members 14 are outwardly biased by spring means 16 and pivot about pins 18. Radially inward movement of members 14 against the bias of spring means 16 is accomplished by movement of camming cone 20 against the upper ends of members 14.

A shaft 22 is rotationally mounted in bearing blocks 24 and is driven by belt 26 and pulley 28 fixed on hollow shaft 22. Axial adjustment of head 12 and motor 34 is made by hand wheel 30 and a threaded shaft 31 to which it is affixed. Belt 26 is driven by motor 34 through pulley 32.

The spinning head 12 and motor 34 are mounted on a frame which includes upstanding members 36 and **36*a* and cross member 38. A support member 40 is attached by means of bolts 41 in slots 42 to the upstanding members 36 and 36*a* and acts as an adjustable mounting plate for the bearing blocks 24 and motor 34**.

To accomplish vertical adjustment of the bearing blocks 24 and motor 34, as well as the spinning head 12, the hand wheel 30 drives threaded shaft 31, to which it is fixed, creating vertical movement of the member 40 by means of a threaded block (not shown) rigidly attached thereto and operably engaged by the threads of the shaft 31.

A means for supporting a cup having an annular sidewall and polygonal base to be provided with a beaded rim is generally designated by the numeral 50 and is located in register below the spinning head 12. The supporting means 50 includes a base plate 52 surrounded by a pair of socket defining members 54 and 55 which together define a polygonal shaped socket, which is a hexagon as illustrated, slightly larger than but similar to the polygonal shape of the base. Base plate 52 is mounted on four shafts 56 connected at their lower base by common plate 58. The plate 58 moves with shafts 56 and has a central opening to clear a bushing assembly 59 during relative motion therebetween.

The shafts 56 pass through an elevator plate 60 which has mounted centrally thereof and on the upper surface thereof a vacuum cup 62. The vacuum cup 62 during relative motion of the elevator plate 60, and the base plate 52 passes through a central opening 64 in base plate 52. The polygonally shaped based plate 52 remains stationary until the elevator plate 60 rises upwardly in to face to face engagement therewith. At this point the vacuum cup 62 extends through and above the opening 64 in base plate 52 for holding engagement with the cup bottom. The purpose of cup 62 is ultimately to pull the cup away from formers 14.

The vertical driving motion of the plate 60 is accomplished by means of cam driven shaft 66. As shaft 66 drives elevator plate 60 initially upwardly, the socket defining members 54 and 55 move up and surround base plate 52 to define the hexagonal socket. Once the elevator plate 60 engages base plate 52, the thus defined socket continues upwardly with the base plate as a unit until a cup located in the socket engages the formers 14 of the spinning head 12.

The base plate 52 in its lowered position is in aligned relationship with the cup entrance slide 70 and the cup exit slide 72. It is held in this position by means of collars 74 which are fixed on shafts 56 and rest on the upper surface of a horizontal frame plate 76 of the machine 10 when the base plate is in its lowest position. The elevator shaft 66 is linked to a pivoted cam follower arm 78 by means of an alignment ball and socket mechanism 80. The cam follower arm 78 is pivoted about a fixed shaft 84 as it is driven by a means of a cam follower wheel 86 pivoted by pin means 88 at its lower corner. The cam follower wheel 86 follows the outer contour of cam 90 in a manner which creates the reciprocation of the shaft 66.

The cups are pushed along the cup entrance slide 70 toward base plate 52 by conveying means (not shown) until they engage a pair of star wheels 92 and 94 located on opposite sides of the slide 70. The star wheels 92 and 94 are fixed to rotatable shafts 96 and 98, respectively, and each include arms 100 which guide and confine the cups into and on the base plate 52 in register with spinning head 12.

A similar pair of star wheels 102 and 104 located on either side of supporting means 50 rotate on shafts 106 and have spaced contoured plastic plates 108 and 110 fixed for rotation with shaft 106 to guide and confine the upper portion of the cups with regard to the base plate 58 and the socket it defines with members 54 and 55.

The star wheels 92 and 94 and 102 and 104 are rotationally mounted on plate 76 and are connected by drive belt 112 to pulleys or sprockets 114 and 116 fixedly mounted, respectively on shafts 98 and 106. Shaft 98 extends through plate 76 and by means a bevel gear connection 118 is driven by shaft 120. Shaft 96 is similarly driven and connected. Shaft 120 is driven by means of a chain 122 which in turn is driven through a sprocket by shaft means 124. Shaft 124 is drivingly engaged to shaft 126 which through means of chain 128 is driven by drive and cam shaft 130.

The engagement between shaft 124 and shaft 126 is by means of a Geneva drive known as "Genevamatic 6P3" which is obtainable from Genevamatic Co., 5200 95th Street N., St. Petersburg, Fla. The drive alternates 120° of drive with 240° of dwell thus stopping the star wheels during the dwell for movement of the cup supporting means 50 up and down to form the bead on the cup.

The shaft 130 also drives the cam 90 and, therefore, controls the timing sequence of the reciprocation of the elevator plate 60 and supporting means 50 by means of reciprocating shaft 66. The shaft 130 may be conventionally rotationally driven from any power source. The various shafts are mounted in bearings 129 in conventional manner.

Fixedly mounted on the shaft 130 behind the cam 90 and the sprocket for driving engagement of chain 128 is a cam 132. The cam 132 has a following wheel 134 pivoted about a pin 136 mounted in a link or yoke 138. Also mounted in yoke or link 138 is a pin 140 which pivotally connects to a shaft 142 such that rotation of shaft 130 and cam 132 provides timed reciprocation in shaft 142. The reciprocation of shaft 142 creates pivot motion in a pair of arms 144 about a pin or pins 146 mounted to extend from either side of member 40. The arms 144 each move in a slot 148 in member 40.

The outer ends of arms 144 have slots 150 with sliding blocks 152 mounted therein for movement as arms 144 are pivoted. The arms may be spring biased upwardly at their outer ends by springs 153 attached to member 40. Downward movement of the ends of arms 144 moves blocks 152 along slots 150 and pivots the blocks about pins 154 lowering a bushing block 160 mounted for movement on shaft 22 such that it is over and connected to the camming cone 20 of spinning head 12. Accordingly, movement of the ends of arms 144 move blocks 152 which move camming cone 20 against the upper ends of forming members 40 into engagement with the cup edge to form the bead in a timed sequence depending on cam 132. Raising arms 144 and cam 20 releases the cup bead from formers 14.

As the cups advance along slide 70, they are pushed by cups behind them being conveyed from the cup former (not shown). The star wheels 92 and 94 rotate to guide and confine the cup closest to the end of slide 70 over the ends of lowered socket defining members 54 and 55 onto the base plate 52. The cup behind the one engaged by the arms 100 of star wheels 92 and 94 is restrained and therefore the line is restrained by the arms 100 until it is indexed forward onto base plate 52 during the next rotation of the star wheels. Star wheels 102 and 104 engage the upper part of the cup during final positioning of the cup on plate 52.

As the cup enters onto the base plate 52 and is confined by the star wheels 102 and 104, the shaft 66 moves the elevator plate 60 and vacuum cup 62 upwardly until the former hits base plate 52 and the latter passes through the base plate 52 and engages the cup bottom. Additional star wheels to aid this action can also be provided. As shaft 66 continues upwardly the entire elevator assemblege or cup supporting means 50 including socket defining members 54 and 55, base plate 52, elevator plate 60 and the cup engaging vacuum cup 62 moves upwardly to engage the cup rim edge in bead formers 14.

After radial movement of the formers 14 to release the cup the support means 50 lowers and the vacuum cup 62 brings the beaded cup downwardly with it. The cup is stripped from vacuum cup 62 as it passes back through opening 64 in base plate 52. As the next cup comes in, the beaded cup exits via slide 72.

As the spinning head 12 and formers 14 make the bead, any dust is kept out of the cup by a positive pressure created by an air stream emitting from an air passage 172 at the end of hollow shaft 22. The upper end of hollow shaft 22 is connected to a pressurized air hose 176 by means of a conventional rotary coupling and valve 178.

During the initial upward movement of the socket defining members 54 and 55, they engage spring biased arms 180, each of which includes a top member 182 and a pair of legs 184 pivoted about pins 186 in blocks 188 fixed to plate 76. The arms 180 act as guides to orient the cup as it enters onto the base plate 52. This ensures the clearance of the socket forming members of the lower edges of the cup polygon base as they raise to surround and engage the cup. Engagement of the spring biased arms 180 by the socket defining members 54 and 55 cams them outwardly about pins 186. Nylon or other antifriction material can be applied to the sides of members 54 and 55 to facilitate this action.

What is claimed is:

1. An apparatus for forming a cup edge comprising in combination:

a means for forming the rim of a cup having an annular sidewall and a polygonal base, means for supporting said cup in register with said means for forming, means for relatively moving said cup and said means for supporting said cup in register toward said means for forming to place said rim in contact with said means for forming, said means for supporting said cup in register including a socket complementary to said polygonal base to prevent rotation of said cup relative to said socket when said cup is seated in said socket.

2. The apparatus of claim 1 in which the means for forming includes radially moving forming members.

3. The apparatus of claim 1 in which said means for relatively moving said cup is an elevator means.

4. The apparatus of claim 3 in which said elevator means is driven by a cam means.

5. The apparatus of claim 1 in which the means for forming includes spinning means for contact with said rim.

6. The apparatus of claim 3 in which said means for supporting said cup in register includes suction means to retain said cup in said socket during movement of said elevator means.

7. The apparatus of claim 1 in which said means for forming includes means to create a positive pressure within said cup.

8. The apparatus of claim 7 in which said means to create a positive pressure is a source of a downwardly directed air stream.

9. The apparatus of claim 3 in which said socket is formed by movement with said elevator means of a plurality of socket defining members.

10. The apparatus of claim 1 which includes means to guide and confine said cup into and on said means for supporting said cup in register.

11. The apparatus of claim 10 in which the means to guide and confine said cup includes a pair of rotationally driven opposed star wheels.

12. The apparatus of claim 11 in which said star wheels include equally spaced projections.

13. The apparatus of claim 4 which includes a pair of rotationally driven opposed star wheels to guide and confine said cup at intervals in relation to movement of said elevator means.

14. The apparatus of claim 13 in which said rotationally driven opposed star wheels are driven by means of a drive train which is in common with the shaft driving the elevator means driving cam.

15. The apparatus of claim 9 in which the means for supporting said cup in register includes a base plate and said socket defining members are capable of movement relative to said base plate during a portion of their movement.

16. The apparatus of claim 15 in which said socket defining members move initially and said base plate remains stationary initially to create the relative movement therebetween.

17. The apparatus of claim 16 in which said base plate and said socket defining members can be moved into a common horizontal plane such that rotationally driven star wheel means can guide and confine cups into and on said base plate of said means for supporting said cup in register with said means for forming.

18. The apparatus of claim 1 in which cup orienting means are included.

* * * * *